(12) United States Patent
Beaven et al.

(10) Patent No.: US 11,926,436 B2
(45) Date of Patent: Mar. 12, 2024

(54) AUTOMATED FUSION AND ANALYSIS OF MULTIPLE SOURCES OF AIRCRAFT DATA

(71) Applicant: GE Aviation Systems Limited, Cheltenham (GB)

(72) Inventors: Frank Beaven, Eastleigh (GB); Maria Louise Watson, Eastleigh (GB)

(73) Assignee: GE Aviation Systems Taleris Limited, Cheltenham (GB)

( * ) Notice: Subject to any disclaimer, the term of this patent is extended or adjusted under 35 U.S.C. 154(b) by 0 days.

(21) Appl. No.: 16/067,222

(22) PCT Filed: Dec. 16, 2016

(86) PCT No.: PCT/EP2016/081614
§ 371 (c)(1),
(2) Date: Jun. 29, 2018

(87) PCT Pub. No.: WO2017/118559
PCT Pub. Date: Jul. 13, 2017

(65) Prior Publication Data
US 2020/0269995 A1  Aug. 27, 2020

(30) Foreign Application Priority Data
Jan. 6, 2016  (GB) ...................................... 1600220

(51) Int. Cl.
*B64F 5/60* (2017.01)
*G07C 5/00* (2006.01)
*G07C 5/08* (2006.01)

(52) U.S. Cl.
CPC ................ *B64F 5/60* (2017.01); *G07C 5/008* (2013.01); *G07C 5/0808* (2013.01)

(58) Field of Classification Search
CPC ......... B64F 5/60; G07C 5/008; G07C 5/0808; G06F 16/00; B64D 2045/0085
See application file for complete search history.

(56) References Cited

U.S. PATENT DOCUMENTS 6,115,656 A * 9/2000 Sudolsky .................. B64F 5/60
701/3
7,293,400 B2  11/2007 Taware et al.
(Continued)

FOREIGN PATENT DOCUMENTS

CN  102163236 A  8/2011
CN  104950875 A  9/2015
(Continued)

OTHER PUBLICATIONS

PCT International Search Report and Opinion Corresponding to PCT/EP2016/081614 dated Mar. 29, 2017.
(Continued)

*Primary Examiner* — Nicholas Kiswanto
*Assistant Examiner* — Jamal A Shah
(74) *Attorney, Agent, or Firm* — Dority & Manning, P.A.

(57) ABSTRACT

Systems and methods for fusing and analyzing multiple sources of data from a plurality of aircraft-related data sources for fault determination and other integrated vehicle health management (IVHM) diagnostics are provided. More particularly, one or more portions of data from a plurality of aircraft-related data sources for one or more aircraft are accessed. One or more alerts indicative of a data anomaly within the one or more portions of aircraft-related data sources can be detected, wherein a type of alert and originating data source associated with each alert as well as optional related confidence scores can be identified. One or more aircraft faults can be determined based at least in part on a correlation of identified types and data sources for detected alerts. An output indicative of the determined one or more aircraft faults can be provided.

20 Claims, 2 Drawing Sheets (56) References Cited

U.S. PATENT DOCUMENTS

| | | | |
|---|---|---|---|
| 7,346,469 B2 | 3/2008 | Taware et al. | |
| 7,769,507 B2 | 8/2010 | Volponi et al. | |
| 7,953,577 B2 | 5/2011 | Yuan et al. | |
| 8,019,504 B2 * | 9/2011 | Jamrosz | G06Q 50/30 |
| | | | 701/32.1 |
| 8,112,368 B2 | 2/2012 | Eklund et al. | |
| 8,335,601 B2 | 12/2012 | Sham et al. | |
| 8,346,700 B2 | 1/2013 | Nwadiogbu et al. | |
| 8,417,410 B2 | 4/2013 | Moeckly et al. | |
| 8,666,569 B2 | 3/2014 | Goodrich et al. | |
| 9,685,087 B2 * | 6/2017 | Berckefeldt | G08G 5/0021 |
| 2004/0176887 A1 | 9/2004 | Kent et al. | |
| 2008/0201381 A1 * | 8/2008 | Desai | G06F 16/20 |
| 2008/0249678 A1 | 10/2008 | Bailly et al. | |
| 2010/0106357 A1 | 4/2010 | Shin et al. | |
| 2011/0115649 A1 * | 5/2011 | Smith | G06F 11/079 |
| | | | 340/963 |
| 2012/0078463 A1 | 3/2012 | Gros et al. | |
| 2012/0151290 A1 * | 6/2012 | Singh | G05B 23/0278 |
| | | | 714/741 |
| 2012/0215450 A1 | 8/2012 | Ashok et al. | |
| 2013/0116996 A1 | 5/2013 | Callan | |
| 2013/0191681 A1 | 7/2013 | Moiseev et al. | |
| 2013/0268241 A1 | 10/2013 | Das et al. | |
| 2014/0088766 A1 | 3/2014 | Tang et al. | |
| 2014/0236395 A1 | 8/2014 | Guillet et al. | |
| 2014/0309806 A1 | 10/2014 | Ricci | |

FOREIGN PATENT DOCUMENTS

| | | |
|---|---|---|
| CN | 103427417 B | 10/2015 |
| CN | 105005317 A | 10/2015 |
| CN | 105955243 A | 9/2016 |
| CN | 106156913 A | 11/2016 |
| EP | 2325826 A1 | 5/2011 |

OTHER PUBLICATIONS

Preliminary Report on Patentability corresponding PCT/EP2016/081614 dated Jul. 19, 2018.

Combined Search and Examination Report Corresponding to GB1600220.6 dated Sep. 5, 2016.

* cited by examiner

AUTOMATED FUSION AND ANALYSIS OF MULTIPLE SOURCES OF AIRCRAFT DATA

FIELD

The present subject matter relates generally to automated systems and methods for fusing and analyzing multiple sources of aircraft data.

BACKGROUND

Vast quantities of data are generally available related to performance tracking for transportation fleets and individual assets. For example, the aviation industry gathers aircraft operational data from a variety of particular sources. Data can be collected from aircraft via Quick Access Recorders (QARs), which can provide airborne recordation of raw flight data parameters received from a number of aircraft sensors and avionic systems. Data can be collected from maintenance records from an airline's Maintenance, Repair and Overhaul (MRO) systems. Data also can be collected from pilot reports or Aircraft Condition Monitoring Systems (ACMS) communications. Still further, Aircraft Communications Addressing and Reporting System (ACARS) messages can include relevant data including aircraft movement events, flight plans, weather information, equipment health, status of connecting flights, and the like.

Predictive analysis of aircraft operational data can offer useful information for maintenance and prognostics for an individual aircraft or entire fleets. This information can benefit engineers, managers, or other specialists within an airline maintenance organization who help solve various aircraft maintenance problems. Many existing systems rely primarily on human interpretation of these vast amounts of data, which can be cumbersome, tedious and time consuming. In addition, enterprise-level analytic systems that consume multiple data streams can sometimes require a composite view of all available data for an asset. Knowledge inferred from such a composite view can be required to build an accurate situational awareness picture for a fleet of assets. Known options can yield limited accuracy and effectiveness in making intelligent decisions about maintenance actions to take and the urgency of taking those actions.

BRIEF DESCRIPTION

Aspects and advantages of examples of the present disclosure will be set forth in part in the following description, or may be learned from the description, or may be learned through practice of the examples disclosed herein.

One example aspect of the present disclosure is directed to a computer-implemented method for fusing and analyzing multiple sources of aircraft data. The method can include accessing, by one or more processors, one or more portions of data from a plurality of aircraft-related data sources for one or more aircraft. The method can also include detecting, by the one or more processors, one or more alerts indicative of the presence of a data anomaly within the one or more portions of aircraft-related data sources. The method can further include identifying, by the one or more processors, a type of alert and originating data source associated with each detected alert. The method can still further include determining, by the one or more processors, one or more aircraft faults based at least in part on a correlation of the identified types and data sources for detected alerts. The method can also include providing, by the one or more processors, an output indicative of the determined one or more aircraft faults.

Another example aspect of the present disclosure is directed to a system for fusing and analyzing multiple sources of aircraft data. The system can include one or more processors and one or more memory devices. The one or more memory devices can store computer-readable instructions that when executed by the one or more processors cause the one or more processors to perform operations. The operations can include accessing one or more portions of data from a plurality of aircraft-related data sources for one or more aircraft. The operations can also include detecting one or more alerts indicative of the presence of a data anomaly within the one or more portions of aircraft-related data sources. The operations can also include identifying a type of alert and originating data source associated with each detected alert. The operations can still further include determining one or more aircraft faults based at least in part on a correlation of the identified types and data sources for detected alerts. The operations can also include providing an output indicative of the determined one or more aircraft faults.

Yet another example aspect of the present disclosure is directed to one or more tangible, non-transitory computer-readable media storing computer-readable instructions that when executed by one or more processors cause the one or more processors to perform operations. The operations can include accessing one or more portions of data from a plurality of aircraft-related data sources for one or more aircraft. The operations can also include detecting one or more alerts indicative of the presence of a data anomaly within the one or more portions of aircraft-related data sources. The operations can also include identifying a type of alert and originating data source associated with each detected alert. The operations can still further include determining one or more aircraft faults based at least in part on a correlation of the identified types and data sources for detected alerts. The operations can also include providing an output indicative of the determined one or more aircraft faults.

Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate aspects of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for fusing and analyzing multiple sources of data from a plurality of aircraft-related data sources for fault determination and other integrated vehicle health management (IVHM) diagnostics. By fusing and analyzing continuously recorded flight data, determinations can be made regarding whether an aircraft fault should be confirmed, derived or rejected based on correlated analysis of alerts from multiple data sources. Associated outputs can include indications of determined aircraft faults and/or associated aircraft maintenance recommendations.

The disclosed systems and methods for fusing and analyzing aircraft data from multiple sources can provide features for automated fault prediction, diagnosis and alerting, and/or identification of potential faults or failures. These features can have a technical effect of detecting aircraft faults early, potentially before they cause disruptions. In addition, advanced notice for planning to fix aircraft issues during scheduled maintenance can advantageously be provided, thus reducing time and cost incurred for maintenance and operational impact. Still further, faults can be determined so that the most effective corrective actions can be applied in a first maintenance visit, avoiding repeated maintenance and removal of parts that do not resolve the fault.

In particular example embodiments, systems and methods can be implemented by accessing a fused collection of multiple sources of air-craft related data. In some examples, aircraft-related data sources can include maintenance data, data from a Quick Access Recorder (QAR), technical disruption data and other data related to particular aircraft flights, post-flight reports (PFR) data, and other aircraft-related data sources. In some examples, aircraft-related data sources can include at least one data source providing data from a given flight for the one or more aircraft and at least one data source from one or more previous flights for the one or more aircraft. In some examples, aircraft-related data sources can be specific to a given aircraft system (e.g., ATA chapter as defined by the Air Transport Association) such that subsequently detected alerts and determined aircraft faults are specific to the given aircraft system.

The plurality of aircraft-related data sources can be applied as input to a statistical model of preconfigured processing rules. In some examples, the preconfigured processing rules can include alert detection rules that help to detect one or more alerts indicative of the presence of a data anomaly within the one or more portions of aircraft-related data sources as well as identify a type of alert and originating data source associated with each detected alert. In some examples, the preconfigured processing rules can include aircraft fault determination rules that help determine one or more aircraft faults based at least in part on a correlation of the identified types and data sources for detected alerts as well as optional additional information such as but not limited to confidence scores assigned to detected alerts and/or data sources. The statistical model can be developed at least in part by machine learning algorithms that receive datasets of aircraft-related data and corresponding processing rules. These datasets are used to help train classifiers for processing subsequent portions of aircraft-related data.

In some examples, preconfigured processing rules can also be configured to assign alert confidence scores and/or data source confidence scores that can be used in part in the ultimate determination of aircraft faults. Alert confidence scores can be assigned to detected alerts to provide a quantifiable value indicative of a historical likelihood that a given alert correlates with a given fault. Data source confidence scores can be assigned to aircraft-related data sources to provide a quantifiable value indicative of an importance level of that data source in determining aircraft faults. The alert confidence scores and/or data source confidence scores can be used in combination with the correlation of detected alerts from across multiple data sources to determine whether a potential issue should result in an aircraft fault determination.

Outputs from the statistical model of preconfigured processing rules can be identified, and can include one or more detected alerts categorized by alert type and corresponding data source and one or more determined aircraft faults. In some examples, outputs indicative of the determined aircraft faults can be provided for display to a user. In some examples, outputs can include aircraft maintenance recommendations associated with determined aircraft faults.

Example aspects of the present disclosure may be discussed with reference to aircraft related data and other avionic systems associated with an aircraft for purposes of illustration and discussion. Those of ordinary skill in the art, using the disclosures provided herein, will understand that the subject matter described herein can be used with other asset-related systems without deviating from the scope of the present disclosure.

Figure 1:
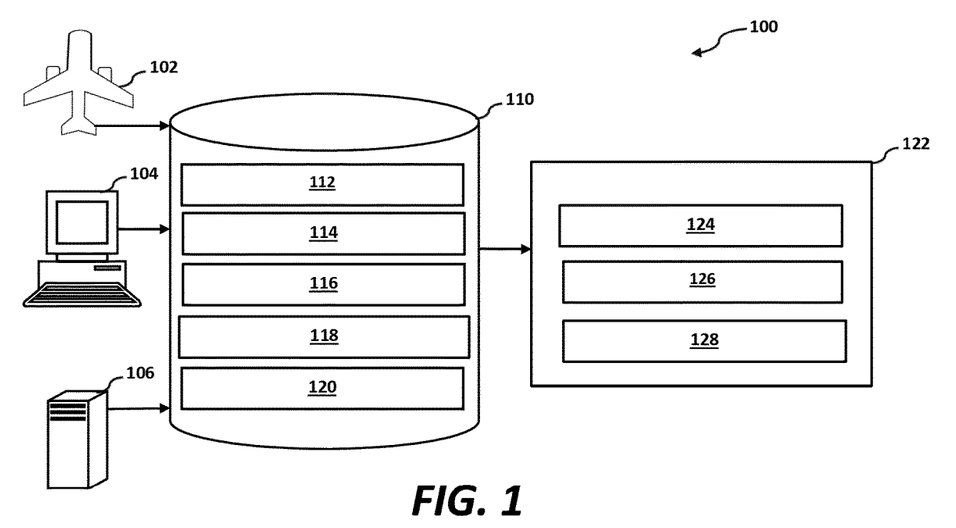
FIG. 1 depicts an example data fusion and analytic system overview according to example embodiments of the present disclosure.

Referring now to the figures, FIG. 1 depicts an example overview of a data fusion and analysis system 100. Portions of data from one or more aircraft-related data sources can be gathered from sensors, user input or other data collection features within an aircraft 102, a client computing device 104, and/or server computing device 106 and collected within a database 110. Data gathered at database 110 can be collected from a variety of particular sources maintained by one or more particular airlines, by general aviation tracking systems, by third party data collection and analysis entities authorized by an airline or other organization to track relevant data, or other entities. Data originating from aircraft 102 and computing devices 104/106 can be accumulated before a flight, during flight and/or after flight and can include data gathered automatically by aircraft sensors and other avionic systems or data that is manually downloaded from an aircraft or manually entered by pilots, engineers, controllers, maintenance personnel, or other specialists assisting with aircraft-related activities and analysis. In some examples, such individuals can access one or more client computing devices 104 onboard an aircraft or in a remote location from the aircraft to provide aircraft-related data that is gathered at database 110.

Different specific types of aircraft-related data can be gathered for fusion at database 110. For example, aircraft maintenance data 112 can be collected from maintenance records from an airline's Maintenance, Repair and Overhaul (MRO) systems, and can include but is not limited to data identifying aircraft parts that have been changed recently or general wear and tear that maintenance crew has identified. Technical disruption data 114 can include data regarding flight delays, cancellations, air turn backs, flight diversions, and the like encountered during aircraft flight. Post-Flight Report (PFR) data 116 can include an electronic form of data that is collected automatically from aircraft systems and/or from information provided by pilot data entry that is pertinent for tracking customized information about particular aircraft flights. Quick Access Recorder (QAR) data 118 can provide airborne recordation of raw flight data parameters received from a number of aircraft sensors and avionic systems. On-board systems can also be configured to continuously record data on aircraft system operation (e.g. flaps and slats deployed, landing gear extended, thrust reversers deployed, brakes applied), and system status, performance and health (e.g. temperatures, pressures, flow rates, tank quantities, valve positions). Additional aircraft-related data 120 gathered within database 110 can originate from still further sources, including but not limited to pilot reports, parts removal registries, Aircraft Condition Monitoring Systems (ACMS), and/or Aircraft Communications Addressing and Reporting System (ACARS) messages that include relevant data such as aircraft movement events, flight plans, route information, weather information, equipment health, status of connecting flights, and the like.

The plurality of aircraft-related data sources gathered at database 110 can be applied as input to a statistical model 122 of data fusion and analytic processing rules. In some examples, the statistical model 122 can include an alert detection algorithm 124 including processing rules configured to detect one or more alerts indicative of the presence of a data anomaly within the one or more portions of aircraft-related data sources as well as identify a type of alert and originating data source associated with each detected alert. In some examples, the statistical model 122 can include a confidence score assignment algorithm 126 including processing rules configured to assign alert confidence scores associated with each detected alert and/or data source confidence scores associated with aircraft-related data sources. In some examples, statistical model 122 can include a fault determination algorithm 128 including processing rules configured to determine one or more aircraft faults based at least in part on a correlation of the identified types and data sources for detected alerts as well as optional additional information such as but not limited to alert confidence scores and/or data source confidence scores.

Figure 2:
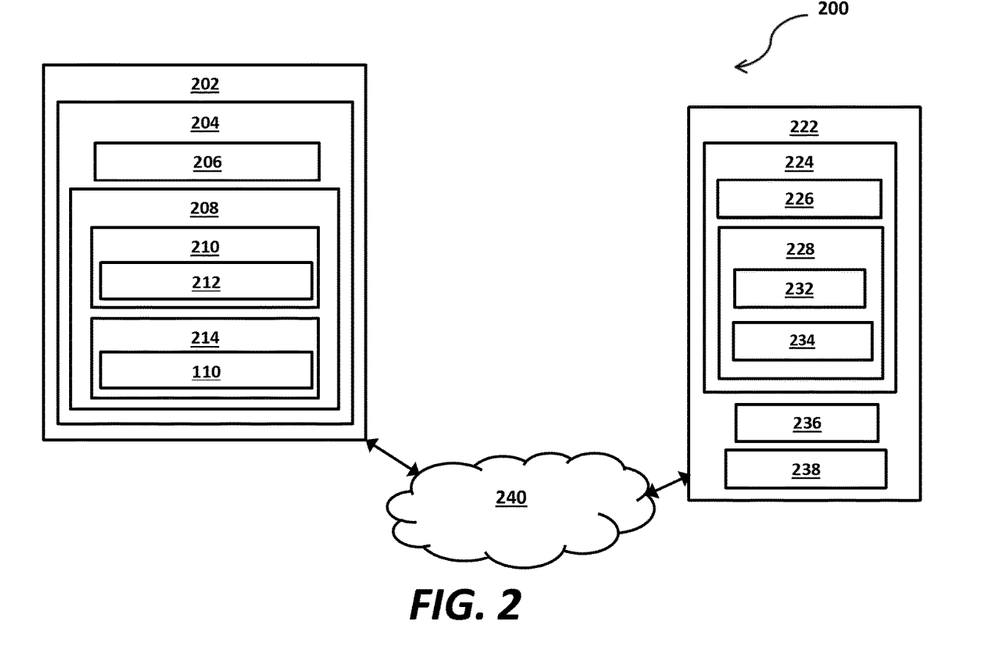
FIG. 2 depicts an example overview of system components for implementing data fusion and analysis features according to example aspects of the present disclosure.

FIG. 2 depicts a computing system 200 that can be used to implement methods and systems for fusion and analysis of data within aviation-related data systems and other asset-related applications. The system 200 can be implemented using a client-server architecture that includes a server 202 and one or more clients 222. Server 202 may correspond, for example, to a web server hosting a data fusion and analysis application. Client 222 may correspond, for example, to a computing device such as computing device 104 or a computing device onboard aircraft 102 that is used as an interface or collection point for gathering aircraft-related data. Client 222 can also correspond, for example, to a computing device configured to receive maintenance diagnostic outputs generated as part of the disclosed data fusion and analysis embodiments.

Each server 202 and client 222 can include at least one computing device, such as depicted by server computing device 204 and client computing device 224. Although only one server computing device 204 and one client computing device 224 is illustrated in FIG. 2, multiple computing devices optionally may be provided at one or more locations for operation in sequence or parallel configurations to implement the disclosed methods and systems of data fusion and analysis. In other examples, the system 200 can be implemented using other suitable architectures, such as a single computing device. Each of the computing devices 204, 224 in system 200 can be any suitable type of computing device, such as a general purpose computer, special purpose computer, laptop, desktop, mobile device, smartphone, tablet, wearable computing device, a display with one or more processors, or other suitable computing device.

The computing devices 204 and/or 224 can respectively include one or more processor(s) 206, 226 and one or more memory devices 208, 228. The one or more processor(s) 206, 226 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 208, 228 can include one or more computer-readable media, including, but not limited to, non-transitory computer-readable media, RAM, ROM, hard drives, flash drives, or other memory devices. In some examples, memory devices 208, 228 can correspond to coordinated databases that are split over multiple locations.

The one or more memory devices 208, 228 can store information accessible by the one or more processors 206, 226, including instructions that can be executed by the one or more processors 206, 226. For instance, server memory device 208 can store instructions 210 for implementing processing rules, operations and algorithms 212 for performing various functions disclosed herein. In some examples, processing rules and algorithms 212 can include but are not limited to the alert detection algorithm 124, confidence score assignment algorithm 126 and/or fault determination algorithm 128 depicted in FIG. 1. In other examples, processing rules and algorithms 212 implement the functions set forth in the flow chart of FIG. 3. The client memory device 228 can store instructions 234 for implementing a browser or application that allows a user to provide and receive information from server 202, including specific aircraft-related data, resulting analytic output and the like. The one or more memory devices 208, 228 can include data 214, 232 that can be retrieved, manipulated, created, or stored by the one or more processors 206, 226. The data 214 stored at server 202 can include, for instance, the plurality of aircraft-related data sources collected at database 110 or other databases for storing information from aircraft- related data streams and other sources.

Computing devices 204 and 224 can communicate with one another over a network 240. In such instances, the server 202 and one or more clients 222 can respectively include a network interface used to communicate with one another over network 240. The network interface(s) can include any suitable components for interfacing with one more networks, including for example, transmitters, receivers, ports, controllers, antennas, or other suitable components. The network 240 can be any type of communications network, such as a local area network (e.g. intranet), wide area network (e.g. Internet), cellular network, or some combination thereof. The network 240 also can include a direct connection between server computing device 204 and client computing device 224. In general, communication between the server computing device 204 and client computing device 224 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The client 222 can include various input/output devices for providing and receiving information to/from a user. For instance, an input device 236 can include devices such as a touch screen, touch pad, data entry keys, and/or a microphone suitable for voice recognition. Input device 236 can be employed by a user to provide aircraft-related data entry or other information used by the disclosed data fusion and analysis systems and methods. An output device 238 can include audio or visual outputs such as speakers or displays for indicating data fusion and analysis outputs, user interfaces, and the like.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

It will be appreciated that the computer-executable algorithms described herein can be implemented in hardware, application specific circuits, firmware and/or software controlling a general purpose processor. In one embodiment, the algorithms are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm.

Figure 3:
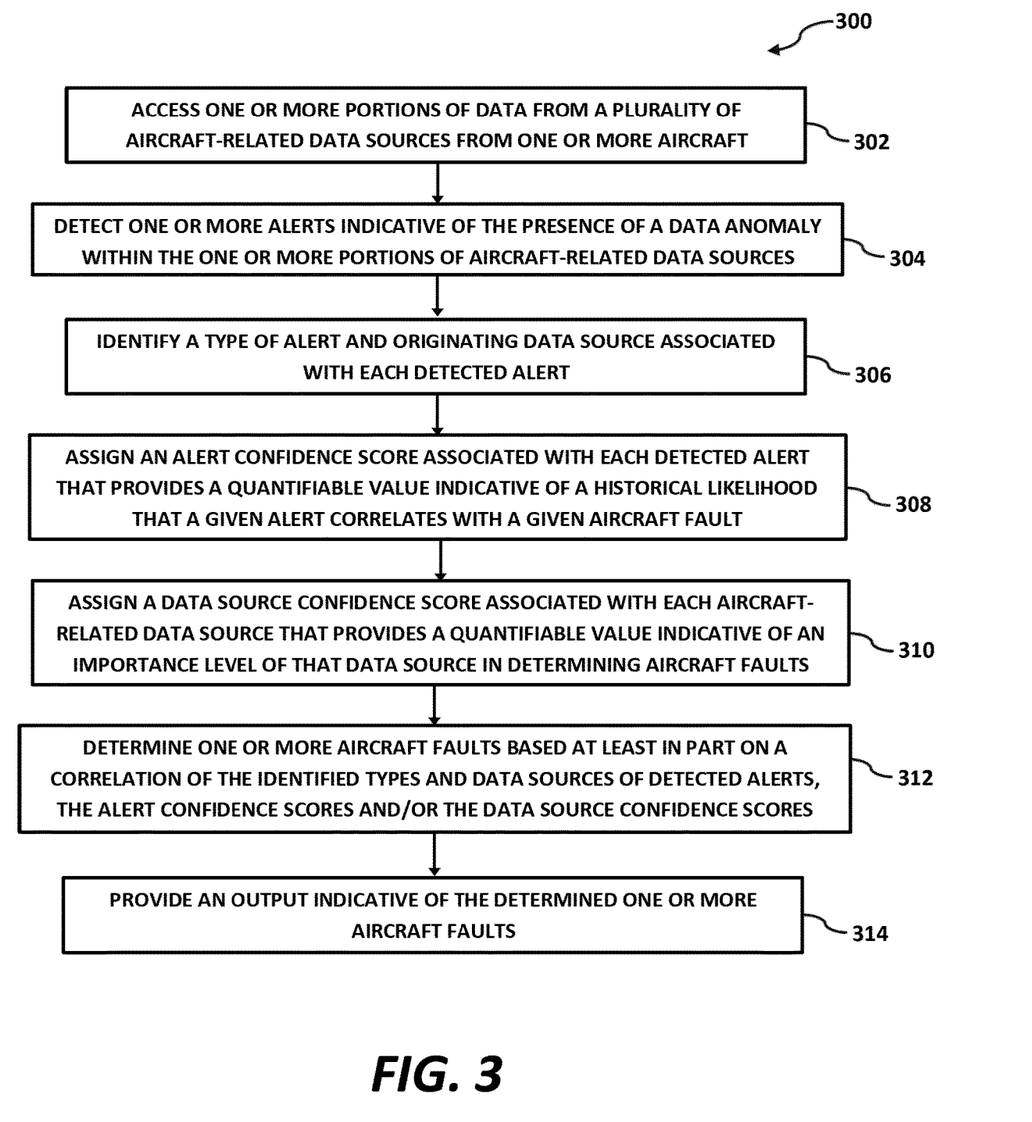
FIG. 3 depicts a flow chart of an example method for fusing and analyzing multiple sources of aircraft data according to example embodiments of the present disclosure.

FIG. 3 depicts a flow chart for implementing features and aspects of various methods disclosed herein. Referring more particularly to FIG. 3, method (300) of fusing and analyzing multiple sources of aircraft data includes accessing (302) one or more portions of data from a plurality of aircraft-related data sources for one or more aircraft. The one or more portions of data accessed at (302) can originate, for example, from the plurality of data sources gathered at database 110 of FIG. 1, including but not limited to aircraft maintenance data, technical disruption data indicative of disruptions to aircraft flights, post-flight report (PFR) data, and/or data obtained from a Quick Access Recorder (QAR) associated with the one or more aircraft. In some examples, aircraft data accessed at (302) can include at least one data source from a given aircraft flight as well as at least one data source from one or more previous flights for the same aircraft. Data from a given flight as well as previous flights can be helpful for identifying general trends (e.g., an operating temperature that is not high for a given flight, yet is steadily increasing from one flight to the next). In some examples, aircraft data from an entire fleet of aircraft or a selected portion of a fleet can be accessed at (302) in order to provide a more comprehensive set of data for fault detection and diagnostic analysis. In some examples, the aircraft data accessed at (302) can be specifically defined relative to a given aircraft system (e.g., ATA chapter as defined by the Air Transport Association) such that subsequently detected alerts and determined aircraft faults are specific to the given aircraft system.

Referring still to FIG. 3, one or more alerts can be detected at (304) from the aircraft-related data accessed at (302). Alerts detected at (304) can be indicative of the presence of a data anomaly within the one or more portions of aircraft-related data sources. In some examples, alerts detected at (304) correspond to condition indicators derived from parameters within the aircraft-related data accessed at (302). For example, the value of certain parameters can be extracted during certain flight phases of each flight (e.g. take-off, climb, cruise) to determine condition indicators over time and detect abnormal trends in aircraft performance. For each alert detected at (304), a type of alert and originating data source can be identified at (306). For example, information identified at (306) could identify a type of alert such as a high air cabin temperature alert detected from an originating data source corresponding to post-flight report (PFR) data. In some examples, types of alerts identified at (306) can also be specifically defined relative to a given aircraft system (e.g., ATA chapter).

In some examples of method (300), confidence scores can be variously assigned at (308), (310) to the types of alert and/or originating data sources identified at (306). For instance, an alert confidence score can be assigned at (308) to provide a quantifiable value indicative of a historical likelihood that a given alert correlates with a given aircraft fault. Alert confidence scores can be assigned for alerts originating from each different aircraft data source accessed at (302). In some examples, alert confidence scores could be determined by mining historic data and determining how often each alert correlates with a given aircraft fault. This alert-to-fault correlation can then be used to determine an alert confidence score value (e.g., a numeric value within a predetermined range such as from 0 to 1.) When alert confidence scores range in value from 0 to 1, a 1 could imply that every time an alert is detected at (304), it correlates with a certain fault on the aircraft and part needing to be replaced. A 0.5 alert confidence score value could imply that half the time this alert is detected at (304) it historically correlates to a verified fault.

In other examples, a data source confidence score can be assigned at (310) to provide a quantifiable value indicative of an importance level of each data source in determining aircraft faults. For each alert detected at (304) and identified at (306), a corresponding data source (e.g., PFR data, QAR data, etc.) from which a data anomaly is detected can also be identified at (306). For each alert, the data sources can be weighted accordingly depending on how important that source is to ultimate fault determination. Similar to alert confidence scores, data source confidence scores also can be defined as a numeric value selected from within a predetermined range, such as from 0 to 1. In some examples, faults can be identified from a single aircraft-related data source, such that it would be appropriate to assign a data source confidence score at (310) for that particular data source a value of 1.0. In other examples, multiple aircraft-related data sources could be assigned a data source confidence score value of 1.0, indicating equal importance in helping to determine an aircraft fault.

Aircraft faults then can be determined at (312) based at least in part on a correlation of the identified alert types and corresponding data sources for detected alerts at (304)/(306), and additionally or alternatively based at least in part on alert confidence scores assigned at (308) and/or data source confidence scores assigned at (310). The correlation of identified types of alerts and data sources can be helpful to identify specific patterns of associations across independent data sources and to generate processing rules for confirming, deriving and/or rejecting a potential issue. For example, if multiple data sources generate an alert, then an aircraft fault for a particular aircraft part creating the data anomaly is much more likely. In another example, however, one data source could generate an alert during a given flight but another data source provides a piece of information explaining that the given flight was a non-standard flight (e.g., a test flight), thus invalidating alerts generated during the given flight for some data sources. In this latter example, an aircraft fault may not be determined at (312) based on the specific correlation of data.

In some examples, determining one or more aircraft faults at (312) from alerts and assigned confidence scores can include multiplying each alert identified at (306) by its alert confidence score assigned at (308) and data source confidence score assigned at (310). This weighting can help provide a quantifiable indication of how important each alert is and whether a determination should be made at (312) either manually or programmatically that a fault should be determined.

In some examples, determining one or more aircraft faults at (312) can involve applying the alerts and data sources data identified at (306) as input to a statistical model of preconfigured processing rules that can be trained using a machine learning process. In some embodiments, a training set of historical data pairs including alerts detected at (304) and corresponding faults determined at (312) can be provided as training inputs to a statistical model. Training inputs to a statistical model can include data for a particular aircraft or for multiple aircraft in a fleet. The statistical model can be built using a learning algorithm such as a Neural Network, Support Vector Machine (SVM) or other Machine learning process. Once the statistical model is adequately trained with a series of alert and fault data points, the statistical model can be employed in real time to analyze subsequently detected alerts and related data provided as input to the statistical model. One or more aircraft faults (e.g., the aircraft faults determined at (312)) can be generated as an output of the statistical model.

Use of a statistical model trained using machine learning as part of a fault determination algorithm can advantageously offer a flexible system that can be readily updated to accommodate advancing capabilities and competencies of newly emerging fault determination processing rules. In addition, such algorithms can be periodically or incrementally trained to maintain and enhance the accuracy of results. This training can be accomplished via user feedback and actions which can be translated and formatted into consumable datasets for the algorithms. In addition, processing rules within a machine-learning based fault determination algorithm can be configurable to facilitate maximum extensibility and also to support rules that are unique to specific customers, types of aircraft and/or specific aircraft systems and/or parts.

Referring still to FIG. 3, once one or more aircraft faults are determined at (312), an output indicative of the determined one or more aircraft faults can be provided at (314). In some examples, an output provided at (314) includes an audio or visual alert provided to a user via a computing system output device. In some examples, outputs provided at (314) can include aircraft maintenance recommendations associated with determined aircraft faults. Maintenance recommendations can be generated at least in part from an analysis of MRO or other maintenance data to derive the effectiveness of different maintenance actions at resolving alerts, faults, or other abnormal condition indicators. Maintenance recommendations can include emergency recommendations for implementing as soon as practicable and/or non-emergency recommendations to incorporate at a next regularly scheduled maintenance event. In some examples, outputs provided at (314) can include flight control outputs or other in-flight notifications to assist with adaptive measures needed for emergency action relative to an operational aircraft.

Specific examples of processing rules that can be implemented in part to assist with determinations of aircraft faults at (312) are now presented to provide context for various steps and features described herein. In such examples, consider that one or more portions of data from a plurality of aircraft-related data sources accessed at (302) are specific to an aircraft air conditioning system (e.g., ATA Chapter 21 data). Specific data sources include QAR data providing time series data from more than 20 different aircraft air conditioning system parts whose performance parameters are regularly sampled at 1 hertz (Hz) intervals. Example aircraft air conditioning performance parameters can include trim air valve positions, cabin/cockpit temperatures, cabin pressure and the like. Specific data sources can also include corresponding PFR data, technical disruption data and maintenance data specifically relating to the aircraft air conditioning system and other relevant information.

In a first example, data anomalies detected in PFR data identifies an intermittent alert originating from a given aircraft's air conditioning unit. This PFR data indicates that the temperature in the cabin is above a desired upper threshold value. QAR data from the current flight and the last ten flights indicates that one of the three air conditional packs that should be controlling the air temperature into the cabin is not cooling the air efficiently. Further analysis indicates that one of the air input valves is stuck open, causing too much air to go through the air conditional pack, thus preventing the air conditional pack from sufficiently cooling the cabin air resulting in warmer than desired conditions. The correlation of information available from collected PFR and QAR data in this first example can help determine that a fault should be determined at (312) for the air input valve that is stuck open.

In a second example, PFR data again identifies an intermittent alert originating from a given aircraft's air conditioning unit. The PFR data indicates that temperature in the aircraft cabin is above the desired upper threshold value. In this second example, there are no alerts being generated from the QAR data for the air conditioning system. Instances when no alerts are identified can be just as important to identify as instances when alerts are identified. Recent flight logs indicate that the aircraft has changed routes and is now flying to Abu Dhabi more often, which is significantly warmer than it previous destinations. Maintenance data for other aircraft in the fleet that do this route regulary indicates similar alerts being reported. An aircraft fault determination can then be made at (312) recommending that the air conditioning unit has a non-urgent service next time the aircraft comes backs in for maintenance checks.

In a third example, PFR data indicates an intermittent alert with one of two cabin pressure controllers (CPCs) in a given aircraft. This PFR data tell us that one of the cabin pressure controllers is malfunctioning. The cabin pressure controllers switch at the end of each flight (CPC1 in previous flight, CPC2 in current flight, CPC1 in next flight and so on). QAR data from a current flight as well as the last ten flights can be accessed to identify that when CPC2 is in control, the cabin pressure is not as well regulated. Additional QAR historical data from the last 2 years is accessed to identify that this has been an ongoing issue for over two months. In addition, data from a similar aircraft in a given fleet indicates that similar PFR data (e.g., one of the CPCs not regulating cabin pressure well resulting in similar PFR messages) was identified. Maintenance data accessed for the similar aircraft indicates that the issue was resolved by replacing the malfunctioning cabin pressure controller. As such, an aircraft fault determination is made at (312) indicating a CPC fault, and the output provided at (314) includes a recommendation that CPC2 be replaced for the aircraft with the ongoing issue.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What we claim is:

1. A computer-implemented method for fusing and analyzing multiple sources of aircraft data, comprising:
   accessing, by one or more processors, one or more portions of data from each of a plurality of aircraft-related data sources for one or more aircraft, the one or more portions of data accessed by the one or more processors being specifically defined for a given aircraft system of the one or more aircraft, at least one of the one or more portions of data being continuously recorded flight data obtained from a recorder and at least one of the one or more portions of data being other data obtained from a data source, the other data being at least one of technical disruption data, maintenance data, and post flight report data;
   detecting, by the one or more processors, one or more alerts indicative of a presence of a data anomaly within the one or more portions of data from each of the plurality of aircraft-related data sources, at least one of the one or more alerts being detected within the continuously recorded flight data and at least one of the one or more alerts being detected within the other data;
   identifying, by the one or more processors, a type of alert and originating data source associated with each detected alert;
   determining, by the one or more processors, one or more aircraft faults based at least in part on a correlation of the identified types and data sources for the detected alerts, wherein the determining comprises identifying, by the one or more processors, one or more specific patterns of associations across the continuously recorded flight data and the other data;
   determining, by the one or more processors, whether the one or more aircraft faults should be confirmed based at least in part on the one or more specific patterns of associations; and
   providing, by the one or more processors and upon confirming the one or more aircraft faults, an output indicative of the determined one or more aircraft faults for maintenance of the aircraft.

2. The method of claim 1, further comprising assigning, by the one or more processors, an alert confidence score associated with each detected alert; and
   wherein determining one or more aircraft faults is further based at least in part on the alert confidence scores assigned to each detected alert.

3. The method of claim 2, wherein the alert confidence score corresponds to a quantifiable value indicative of a historical likelihood that a given alert correlates with a given fault.

4. The method of claim 1, further comprising assigning, by the one or more processors, a data source confidence score for each of the aircraft-related data sources; and
   wherein determining one or more aircraft faults is further based at least in part on the data source confidence scores assigned to each of the aircraft-related data sources.

5. The method of claim 1, further comprising:
   assigning, by the one or more processors, an alert confidence score associated with each detected alert, wherein each alert confidence score corresponds to a quantifiable value indicative of a historical likelihood that a given alert correlates with a given fault;
   assigning, by the one or more processors, a data source confidence score for each of the aircraft-related data sources, wherein each data source confidence score corresponds to a quantifiable value indicative of an importance level of that data source in determining aircraft faults; and
   wherein determining one or more aircraft faults is further based at least in part on the alert confidence scores associated with each detected alert and the data source confidence scores assigned to each of the aircraft-related data sources.

6. The method of claim 1, wherein the one or more portions of data from a plurality of aircraft-related data sources includes at least one data source providing technical disruption data indicative of disruptions to at least one flight for the one or more aircraft.

7. The method of claim 1, wherein the one or more portions of data from a plurality of aircraft-related data sources includes at least one data source providing maintenance data for the one or more aircraft.

8. The method of claim 1, wherein the one or more portions of data from a plurality of aircraft-related data sources includes at least one data source obtained from a Quick Access Recorder (QAR) associated with the one or more aircraft or at least one data source providing Post Flight Report (PFR) data.

9. The method of claim 1, wherein the one or more portions of data from a plurality of aircraft-related data sources includes at least one data source from a given flight for the one or more aircraft and at least one data source from one or more previous flights for the one or more aircraft.

10. The method of claim 1, wherein a corrective maintenance action is performed based at least in part on the output indicative of the one or more aircraft faults.

11. The method of claim 1, further comprising applying, by the one or more processors, a plurality of aircraft-related data streams for one or more aircraft as an input to a statistical model of preconfigured processing rules, and wherein the one or more detected alerts and the one or more aircraft faults are identified as the output from the statistical model of preconfigured processing rules.

12. A system for fusing and analyzing multiple sources of aircraft data, comprising:
   one or more processors; and
   one or more memory devices, the one or more memory devices storing computer-readable instructions that when executed by the one or more processors cause the one or more processors to perform operations, the operations comprising:
      accessing one or more portions of data from each of a plurality of aircraft-related data sources for one or more aircraft, the one or more portions of data accessed by the one or more processors being specifically defined for a given aircraft system of the one or more aircraft, at least one of the one or more portions of data being continuously recorded flight data obtained from a recorder and at least one of the one or more portions of data being other data obtained from a data source, the other data being at least one of technical disruption data, maintenance data, and post flight report data;
      detecting one or more alerts indicative of a presence of a data anomaly within the one or more portions of data from each of the plurality of aircraft-related data sources, at least one of the one or more alerts being detected within the continuously recorded flight data and at least one of the one or more alerts being detected within the other data;
      identifying a type of alert and originating data source associated with each detected alert;
      determining one or more aircraft faults based at least in part on a correlation of the identified types and data sources for the detected alerts, wherein the determining comprises identifying, by the one or more processors, one or more specific patterns of associations across the continuously recorded flight data and the other data;
      determining, by the one or more processors, whether the one or more aircraft faults should be confirmed based at least in part on the one or more specific patterns of associations; and;
      providing, upon confirming the one or more aircraft faults, an output indicative of the determined one or more aircraft faults.

13. The system of claim 12, the operations further comprising:
   assigning an alert confidence score associated with each detected alert, wherein each alert confidence score corresponds to a quantifiable value indicative of a historical likelihood that a given alert correlates with a given fault;
   assigning a data source confidence score for each of the aircraft-related data sources, wherein each data source confidence score corresponds to a quantifiable value indicative of an importance level of that data source in determining aircraft faults; and
   wherein determining one or more aircraft faults is further based at least in part on the alert confidence scores associated with each detected alert and the data source confidence scores assigned to each of the aircraft-related data sources.

14. The system of claim 12, wherein the one or more portions of data from a plurality of aircraft-related data sources includes one or more of at least one data source providing technical disruption data indicative of disruptions to at least one flight for the one or more aircraft, at least one data source providing maintenance data for the one or more aircraft, at least one data source obtained from a Quick Access Recorder (QAR) associated with the one or more aircraft, or at least one data source providing Post Flight Report (PFR) data.

15. The system of claim 12, wherein the one or more portions of data from a plurality of aircraft-related data sources includes at least one data source from a given flight for the one or more aircraft and at least one data source from one or more previous flights for the one or more aircraft.

16. The system of claim 12, wherein the one or more portions of data from a plurality of aircraft-related data sources for one or more aircraft are specific to a given aircraft system such that the one or more detected alerts and the one or more determined aircraft faults are specific to the given aircraft system.

17. The system of claim 12, the operations further comprising applying a plurality of aircraft-related data streams for one or more aircraft as an input to a statistical model of preconfigured processing rules, and wherein the one or more detected alerts and the one or more aircraft faults are identified as output from the statistical model of preconfigured processing rules.

18. One or more tangible, non-transitory computer-readable media storing computer-readable instructions that when executed by one or more processors cause the one or more processors to perform operations, the operations comprising:
   accessing one or more portions of data from each of a plurality of aircraft-related data sources for one or more aircraft, the one or more portions of data accessed by the one or more processors being specifically defined for a given aircraft system of the one or more aircraft, at least one of the one or more portions of data being continuously recorded flight data obtained from a recorder and at least one of the one or more portions of data being other data obtained from a data source, the other data being at least one of technical disruption data, maintenance data, and post flight report data;
   detecting one or more alerts indicative of a presence of a data anomaly within the one or more portions of data from each of the plurality of aircraft-related data sources, at least one of the one or more alerts being detected within the continuously recorded flight data and at least one of the one or more alerts being detected within the other data;
   identifying a type of alert and originating data source associated with each detected alert;
   determining one or more aircraft faults based at least in part on a correlation of the identified types and data sources for the detected alerts, wherein the determining comprises identifying, by the one or more processors, one or more specific patterns of associations across the continuously recorded flight data and the other data;
   determining, by the one or more processors, whether the one or more aircraft faults should be confirmed based at least in part on the one or more specific patterns of associations; and
   providing, upon confirming the one or more aircraft faults, an output indicative of the determined one or more aircraft faults.

19. The computer-readable media of claim 18, the operations further comprising:
   assigning an alert confidence score associated with each detected alert, wherein each alert confidence score corresponds to a quantifiable value indicative of a historical likelihood that a given alert correlates with a given fault;

assigning a data source confidence score for each of the aircraft-related data sources, wherein each data source confidence score corresponds to a quantifiable value indicative of an importance level of that data source in determining aircraft faults; and wherein determining one or more aircraft faults is further based at least in part on the alert confidence scores associated with each detected alert and the data source confidence scores assigned to each of the aircraft-related data sources.

20. The computer-readable media of claim 18, wherein the one or more portions of data from a plurality of aircraft-related data sources includes one or more of at least one data source providing technical disruption data indicative of disruptions to at least one flight for the one or more aircraft, at least one data source providing maintenance data for the one or more aircraft, at least one data source obtained from a Quick Access Recorder (QAR) associated with the one or more aircraft, or at least one data source providing Post Flight Report (PFR) data.

* * * * *